United States Patent [19]
Koehler et al.

[11] Patent Number: 5,497,160
[45] Date of Patent: Mar. 5, 1996

[54] METHOD AND APPARATUS FOR IMPROVED AUTO-CORRELATION AND RANGE CORRELATION IN PSEUDO-RANDOM NOISE CODED SYSTEMS

[75] Inventors: Thomas F. Koehler, Scottsdale; Carl M. Willis, Mesa, both of Ariz.

[73] Assignee: Motorola, Inc., Schaumburg, Ill.

[21] Appl. No.: 123,508

[22] Filed: Sep. 17, 1993

[51] Int. Cl.⁶ ............................ G01S 13/12; G01S 13/28; G01S 13/40

[52] U.S. Cl. ................... 342/145; 342/189; 342/127; 342/132; 342/135; 342/203

[58] Field of Search ........................... 342/145, 127, 342/131, 132, 135, 189, 203, 159

[56] References Cited

U.S. PATENT DOCUMENTS

| | | | |
|---|---|---|---|
| 3,614,623 | 10/1971 | McAuliffe | 375/232 |
| 3,774,206 | 11/1973 | Rauch | 342/89 |
| 4,513,288 | 4/1985 | Weathers et al. | 342/201 |
| 4,577,309 | 3/1986 | Barazeche et al. | 370/32 |
| 4,817,113 | 3/1989 | Lindquist et al. | 375/1 |
| 5,389,932 | 2/1995 | Ota et al. | 342/189 |

OTHER PUBLICATIONS

"Problems Of The Statistical Theory Of Radar", P. A. Bakut, I. A. Bol'shakov et al., Translation, Foreign Technology Division, Air Force systems Command, Wright–Patterson Air Force Base, Ohio, (Oct. 19, 1964), Chapter 1.2.4, pp. 24–27.

*Primary Examiner*—John B. Sotomayor
*Attorney, Agent, or Firm*—Gregory J. Gorrie

[57] ABSTRACT

A method and apparatus is disclosed for improved out-of-range rejection in pseudo-random noise (PN) coded systems by adjusting the relative phase difference between the two phase states of a bi-phase modulation. The energy in the spectral lines of the bi-phase modulated RF signal to generate a signal to be fedback to a voltage-controlled bi-phase modulator to adjust the relative phase difference between the two phase states. Sampled signals are mixed down to baseband using single sideband suppressed carrier modulation of the center frequency of the transmitted signal and the offset frequency. The offset frequency is chosen to be less than the PN code repetition frequency. The baseband signal is filtered and envelop detected producing a DC voltage proportional to the amplitude of the center line of the PN spectrum which is compared to either a fixed reference or to the amplitude of one or more of the remaining lines in the spectrum. The comparison provides an error signal adjusting the phase of the bi-phase modulator providing improved out-of-range rejection.

26 Claims, 6 Drawing Sheets

METHOD AND APPARATUS FOR IMPROVED AUTO-CORRELATION AND RANGE CORRELATION IN PSEUDO-RANDOM NOISE CODED SYSTEMS

FIELD OF THE INVENTION

This invention relates in general to the field of communications and radar systems, in particular to pseudo-random noise coded systems and more particularly to those systems using bi-phase modulation for autocorrelation.

BACKGROUND OF THE INVENTION

In radar and communications systems, it is important to discriminate the in-range target from the clutter return of out-of-range unwanted signals. Pseudo-random noise (PN) coded systems are used to obtain range information while using a low power continuous wave (CW) transmitter.

PN code sequences, sometimes referred to as maximal length binary code sequences have approximately the same statistical properties as randomly generated binary code sequences and are referred to in the literature by various names depending on their use.

Most applications of PN code sequences modulate the PN code onto a carrier frequency prior to transmission, and subsequently demodulate the PN code in the receive path in a correlation process. Phase modulation is commonly used in PN code applications in which the two binary states of the PN code sequence effect a phase shift of the carrier separated by 180 degrees.

In designing a PN coded system (radar or communications) there is a tradeoff to be made between PN code pulse width, PN code length, Doppler frequency band width and transmitter center frequency. The PN code pulse width establishes the system's range resolution, the PN code length establishes the system's out-of-range rejection of returns from unwanted clutter signals and the Doppler frequency band width establishes the maximum closing velocity. For a given range resolution, closing velocity and transmitter center frequency, the PN code is limited in length and therefore the rejection of returns from unwanted clutter signals is limited.

Conventional PN systems use bi-phase modulation where the two phase states are precisely out-of-phase. The rejection of undesired signals in such systems is proportional to the square of the PN code length. Thus the amount of rejection is theoretically limited when the PN code is limited in length. For example, in the case of a radar fuze, the limited rejection of clutter and interference sets a lower bound on the sensitivity of the fuze.

Thus what is needed are a method and apparatus to reduce the range sidelobes beyond the theoretical limit to improve auto-correlation and out-of-range clutter rejection.

SUMMARY OF THE INVENTION

Accordingly, there is provided a new and improved method for improving autocorrelation in a pseudo-random noise coded system comprising the steps of generating a pseudo-random noise coded sequence and modulating a carrier frequency with a bi-phase modulator to produce a modulated carrier frequency. The bi-phase modulator desirably has two phase states, each having a relative phase difference. In a preferred embodiment, the method includes sampling the modulated carrier frequency to generate an error signal and adjusting the relative phase difference of the two phase states based on the error signal.

The present invention further provides a pseudo-random noise-coded system for improving discrimination between returns from a target from returns from clutter comprising, a radio frequency generator for generating a carrier frequency and a transmit bi-phase modulator for generating a transmit signal. The transmit signal is comprised of the carrier frequency phase modulated with a pseudo-random noise coded sequence of a first code state where the transmit bi-phase modulator is coupled to the radio frequency generator and has a transmit phase control port and a transmit output port. The system further comprises a transmit antenna for transmitting the transmit signal coupled to the transmit output port of the bi-phase modulator, and also a receive bi-phase modulator for generating a reference signal. The reference signal is comprised of the carrier frequency phase modulated with the pseudo-random noise coded sequence of a second code state where the second code state is a delayed version of the first code state. The receive bi-phase modulator is coupled to the radio frequency generator and has a receive phase control port and a receive output port.

The system further comprises, a receive antenna for receiving a received signal, the received signal being a Doppler shifted version of the transmit signal, and a correlator for producing a Doppler frequency from the received signal and the reference signal.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

Figure 1:
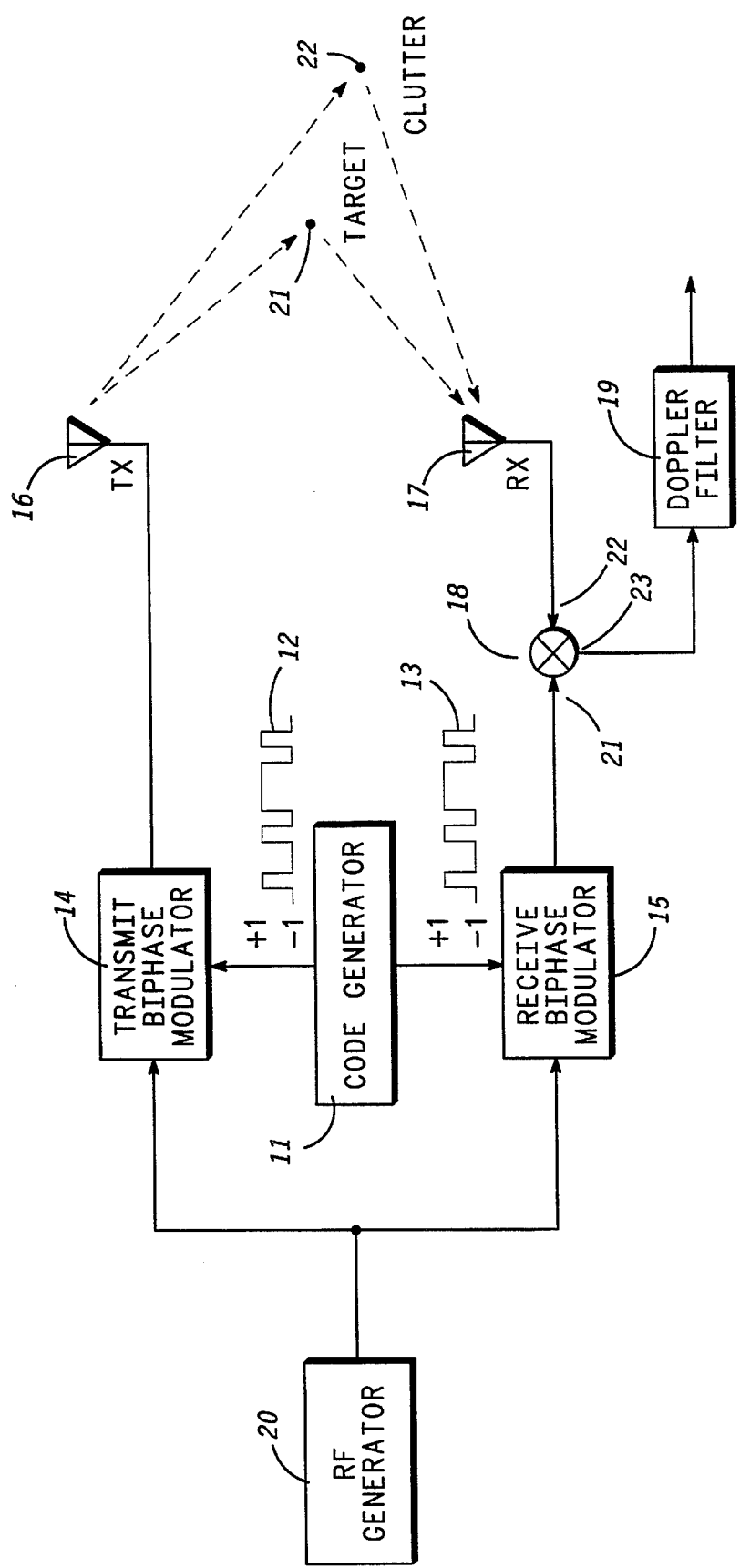
FIG. 1 illustrates a radar system using pseudo-random noise (PN) code sequencing.

FIG. 1 illustrates a radar system using a pseudo-random noise (PN) code sequence. PN codes 12 and 13 are modulated onto the carrier in transmit bi-phase modulator 14 and receive bi-phase modulator 15, respectively. PN code 13 is a delayed version of PN code 12, where the delay corresponds to the expected range delay of target 21. The distance to the target 21 causes the signal received at the receive antenna 17 to be delayed relative to the transmit signal. The motion of the target 21 causes a Doppler frequency shift $f_d$ in the receive signal.

A way to discriminate between targets and clutter is by using the difference in range. In FIG. 1, the distance to the clutter 22 causes the received signal at receive antenna 17 to be delayed from the transmit signal by more than the signal from the target 21. Since the clutter return has a different delay than the target, it will not correlate with the receive PN code and will thus be significantly suppressed. In many applications, the clutter signal is much larger than the target signal. If the target is an aircraft or missile, for example and the clutter is the ground or ocean the clutter signal can be 10,000 to 1,000,000 times larger than the target signal (40 to 60 dB), thus requiring the out-of-range clutter to be suppressed by 10,000 to 1,000,000 greater than the in-range target returns. This difference in suppression between in-range returns from objects positioned at correlated range, and out-range return from objects positioned at uncorrelated ranges is called out-of-range rejection.

The terms maximal length binary sequence, PN code sequence, and PN code are synonymous. Well known properties of a maximal length binary code sequence include:

Code Length: All maximal length binary code sequences are periodic and have a code length of L bits where $L=2^N-1$ and N is a positive integer Balance Property: In any period, $L\tau$ where L is the code length and $\tau$ is the bit period, the number of +1 code states and the number of −1 code states differ by exactly one.

Run Property: In any period, one-half of the runs of each code state (i.e. +1's and −1's) are of length one, one-fourth are of length two, one-eighth are of length three, etc. A run of length $N=\log_2(L+1)$ of either state cannot exist.

Autocorrelation Property: The autocorrelation function may be expressed as $$\phi_m = \sum_{k=1}^{L} a_k a_{k+m}$$

where k and m are integers and $a_k$ is the amplitude of the $k^{th}$ bit (+1 or −1). Thus defined, the autocorrelation function of a maximal length binary sequence is evaluated as $$\phi_m = \begin{cases} L \text{ for } m=jL \quad j=\ldots,-1,0,1,2,\ldots \\ -1 \text{ elsewhere} \end{cases}$$

Autocorrelation Property Extension: If m equals an integer multiple of the code length L, then $a_k a_{k+m}=+1$ for all k and the autocorrelation function may be expressed as:

$$\phi_m = \sum_{k=1}^{L} a_k a_{k+m} = \frac{L-1}{2}(-1)(-1) + \frac{L+1}{2}(+1)(+1) = L$$

in which for (L−1)/2 of the L terms, $a_k=-1$ while $a_{k+m}=-1$ resulting in $a_k a_{k+m}=+1$ for (L+1)/2 of the L terms, $a_k=+1$ while $a_{k+m}=+1$ resulting in $a_k a_{k+m}=+1$ If m does not equal an integer multiple of L, then the autocorrelation function may be expressed as:

$$\phi_m = \sum_{k=1}^{L} a_k a_{k+m} = \frac{L-3}{4}(-1)(-1) + \frac{L+1}{4}(-1)(+1) +$$

$$\frac{L+1}{4}(+1)(-1) + \frac{L+1}{4}(+1)(+1) = -1$$

in which for (L−3)/4 of the L terms, $a_k=-1$ while $a_{k+m}=-1$ resulting in $a_k a_{k+m}=+1$ for (L+1)/4 of the L terms, $a_k=-1$ while $a_{k+m}=+1$ resulting in $a_k a_{k+m}=-1$ for (L+1)/4 of the L terms, $a_k=+1$ while $a_{k+m}=-1$ resulting in $a_k a_{k+m}=-1$ for (L+1)/4 of the L terms, $a_k=+1$ while $a_{k+m}=+1$ resulting in $a_k a_{k+m}=+1$ Power Spectral Density: From the Wiener-Khintchine theorem, the power spectral density of any wide-sense stationary random process may be found as the Fourier transform of the autocorrelation function. These principles are well known in the art.

The autocorrelation function of a pseudo-random code and the range correlation process occur in down conversion mixer 18 as a function of range delay. For example, in a radar system which uses a maximal length binary code sequence and symmetrical bi-phase modulation (0° and 180°), the theoretical limit of the sidelobe suppression in the uncorrelated region of the range response is $10 \log(1/L^2)$ where L is the code length, which follows directly from the code autocorrelation properties. These properties are well known in the art.

The commonly accepted theoretical limit of the out-of-range rejection in the uncorrelated region of the range response, $10 \log(1/L^2)$, assumes that the two PN code states input to the bi-phase modulator have relative phase states separated by exactly 180 degrees. The out-of-range-rejection performance can exceed the commonly accepted theoretical limit if the relative phase of the two bi-phase modulator phase states is appropriately offset slightly from 180 degrees.

In applications which use a maximal length binary code sequence, there is a place at which two signals which both have the PN code characteristics with amount of relative delay come together in a correlation process. For example, in the radar block diagram of FIG. 1, the correlation process occurs in down conversion mixer 18 followed by low pass Doppler filter 19.

When the range correlation process is viewed in the frequency domain, a reference signal having the spectrum characteristic of a maximal length code sequence is input to the correlator at node 21 of down conversion mixer 18. A Doppler shifted version of the same code which is delayed in time is input at node 22 of down conversion mixer 18.

A property of a maximal length binary code sequence is that the product of a maximal length PN sequence and a cyclic shift produces a cyclically shifted replica of the same maximal length code sequence. This property ensures that when the range delay corresponds to any uncorrelated range (i.e. delay is greater than a bit width), the output of the correlator at node 23 of down conversion mixer 18 will also have the spectral characteristics of a maximal length PN code. Doppler filter 19 completes the correlation process by rejecting all of the energy in the uncorrelated signal except for the small amount at the center-line. At correlated range delays the signal at the output of the correlator is a single spectral line positioned at the Doppler frequency which is passed by Doppler filter 19. For example, the uncorrelated energy in the Doppler pass band for a 255 bit maximal length code, would be 24 dB (i.e. 10 log(1/L)) below the adjacent spectral lines and 48 dB, (i.e. 10 log(1/L$^2$)) below what it would be were it correlated with a delay= 0. A maximal length PN code sequence of length 255 bits is used here for conveniences only. The principles described apply to maximal length PN code sequences of any allowable length. This assumes that relative phase of the two bi-phase modulator phase states is 180 degrees.

The range correlation process can also be visualized in the time domain which provides insight into why the out-of-range rejection performance can be improved if the relative phase of the two bi-phase modulator states is offset appropriately from 180 degrees. The correlator time domain waveform output at node 23 of mixer 18 can be viewed as a sine wave at the Doppler frequency, phase modulated by the maximal length PN code characteristics. A maximal length code sequence received at node 21 of mixer 18 and a range delayed shift of the same code sequence received at node 22 of mixer 18 is combined in mixer 18 to produce at node 23 a cyclic shift of the original maximal length code sequence modulated by the Doppler frequency.

There are four possible conditions that occur in mixer 18 for the possible code states of −1 and +1 for both signals at inputs 21 and 22. Table I shows the four possible code states A, B, C and D.

TABLE I

| FIG. 1 Reference | PN Code Condition | | | |
|---|---|---|---|---|
| | A | B | C | D |
| Node 21 Code State | −1 | −1 | +1 | +1 |
| Node 22 Code State | −1 | +1 | −1 | +1 |
| Node 21 Phase State | ~0° | ~0° | ~180° | ~180° |
| Node 22 Phase State | ~0° | ~180° | ~0° | ~180° |
| Node 23 Phase State | ~0° | ~180° | ~180° | ~0° |
| Frequency of Occurrence (Code Length = 255) | 63/255 | 64/255 | 64/255 | 64/255 |

For an example code of length 255, for 63/255th's of each code repetition interval (CRI), the reference signal at node 21 has been modulated by a −1 code state which occurs for 127 of the 255 code bits and is modulated 0 degrees reference, while the range delayed and Doppler shifted signal at node 22 is concurrently modulated by a −1 code state which also occurs for 127 of the 255 code bits and is also modulated 0 degrees reference in this example. The other three possible conditions occur for 64/255th's each during the CRI. If the various code states are replaced by their complements, the result remains the same.

The properties of the maximal length PN code sequence are such that these example code conditions always occur for an uncorrelated range delay. Two of the conditions result in 0 degrees reference phase shift of the bi-phase modulated Doppler sine wave while the other two conditions result in 180 degrees of phase shift. It follows that the bi-phase modulated uncorrelated Doppler sine wave present a node 23 of mixer 18 is in-phase with the correlated Doppler sine wave for 127/255th's of a CRI and out-of-phase for 128/255th's of a CRI. When the bi-phase modulated Doppler sine wave is passed through Doppler filter 19, a pure Doppler sine wave results with a normalized voltage amplitude of 1/255 which is out-of-phase with the unity amplitude Doppler sine wave that would result were the delay equal to 0 or a multiple of the code length (correlated range).

Additional sidelobe reduction beyond the −48 dB, (i.e., 10 log(1/L$^2$)), theoretically achieved from the example 255 bit PN code autocorrelation function may be obtained by intentionally biasing the relative phase difference of both transmit bi-phase modulator 14 and receive bi-phase modulator 15 by a controlled amount. For example, the relative phase difference effected by the bi-phase modulator for the two code states can be varied slightly from 180 degrees.

The waveform at node 21 of down conversion mixer 18 may be considered as a phasor rotating at an angular rate of $2\pi f_o$ radians per second which is periodically bi-phase modulated by the PN code characteristics. The waveform at down conversion mixer 18 at node 22 may be considered as a phasor rotating at an angular rate of $2\pi(f_o+f_d)$ radians per second which is also periodically bi-phase modulated The instantaneous phase of the waveform at node 23 is given as the instantaneous phase at node 22 minus the instantaneous phase at node 21. The resultant phasor at node 23 rotates at an angular rate of $2\pi f_d$ radians per second with four possible modulated phase states, two of which are near 0 degrees reference and two are modulated near 180 degrees as shown in TABLE I. The properties of the maximal length binary code sequence ensure that all four conditions have the frequency of occurrence shown in Table I for all uncorrelated range delays.

For a code length of 255, for example, a modulator phase bias condition which results in significantly improved sidelobe suppression in the uncorrelated region of the range correlation response occurs when the modulator phase bias is set to between 6 and 8 degrees for both the transmit and receive bi-phase modulators 14, 15. Vector cancellation results when the vectors for each of the four conditions weighted by their frequency of occurrence are summed (carrier phase is set to 0 degrees). Theoretically, perfect phase cancellation is achieved, for example when the phase bias is set to ARC-COSINE(127/128)= 7.17 degrees for both modulators.

For an example code length of 255, improved range sidelobe reduction is theoretically achieved when the phase offset of both modulators is near either plus or minus 7 degrees. For example, one of the two code states arbitrarily effects a 0 degree reference phase by the bi-phase modulator while the other code state effects 180 degrees plus the phase bias (i.e. 173 and 187 degrees for −7 and +7 degrees phase bias respectively).

The practical concerns in implementing this phase biasing technique in hardware applications are that slight variations from the ideal conditions previously discussed produce large variations in sidelobe suppression, and that a narrow phase bias window results, for example, in at least 60 dB of range sidelobe reduction.

Figure 2:
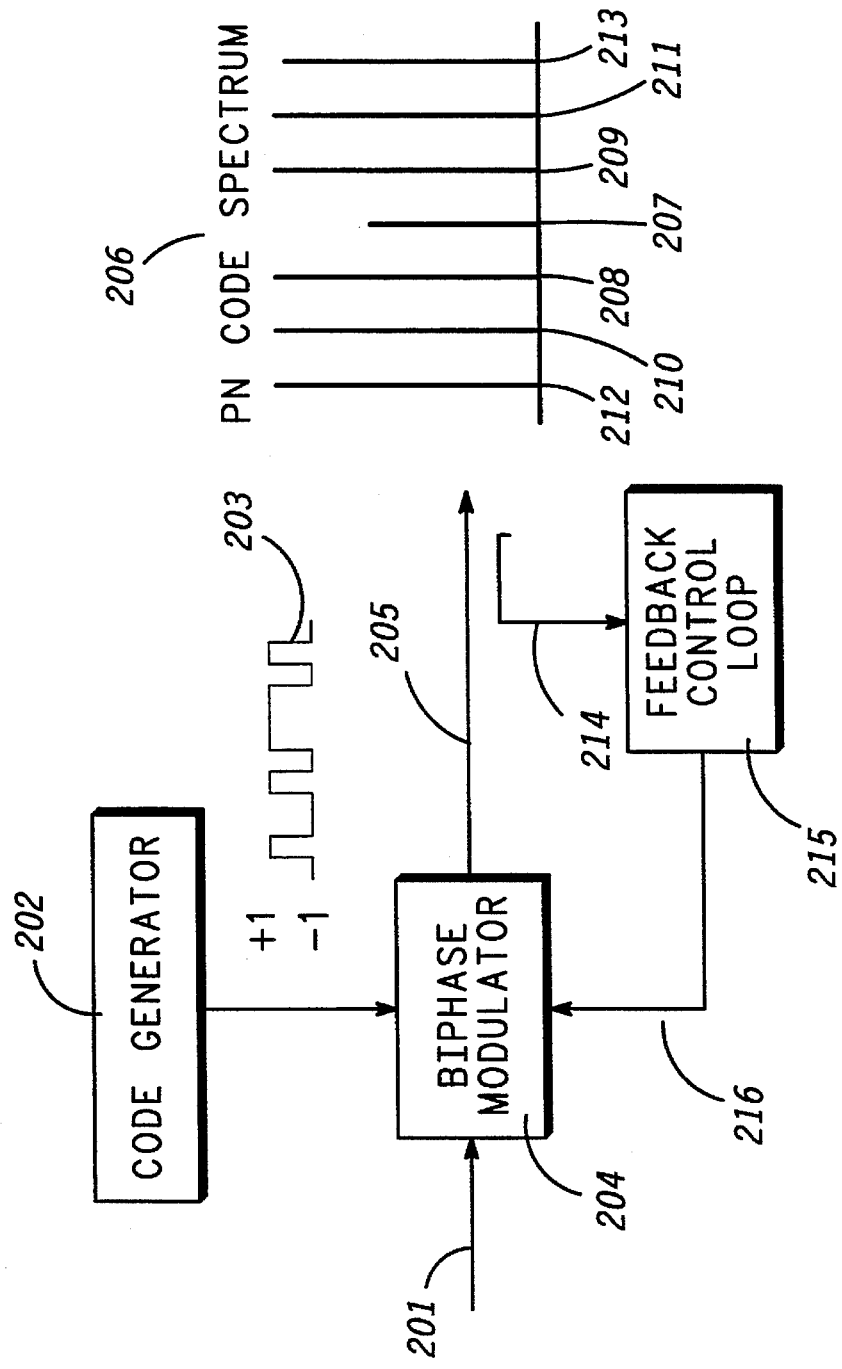
FIG. 2 illustrates a feedback control loop which controls the relative phase of two bi-phase modulator phase states in accordance with the present invention.

In a preferred embodiment of the present invention, a feedback control loop is implemented to maintain the desired relative phase difference in the bi-phase modulator over time and operating environment variations to effect an improvement in the out-of-range clutter rejection. FIG. 2 illustrates a feedback control loop which controls the relative relative phase difference between the two bi-phase modulator phase states in accordance with the present invention. The relative phase difference in the bi-phase modulator is determined from measurements of PN code spectrum 206 at the output of bi-phase modulator 204. The magnitude of spectral center line 207 relative to the magnitude of adjacent spectral lines 208, 213 provides a measure of the relative phase difference between the two phase states of the bi-phase modulator. The relative phase difference in bi-phase modulator 204 may be electronically adjusted to a desired value as indicated by the spectral measurement in a control loop. The control loop may desirably automatically compensate for changes in the operating environment.

In FIG. 2, a carrier frequency, $f_o$, at the bi-phase modulator input 201 is modulated by PN code 203 to produce a bi-phase modulated sine wave at bi-phase modulator output 205. The power spectrum at bi-phase modulator output 205 appears as the characteristic PN code spectrum well know in the art which comprises a plurality of spectral lines separated by the code repetition frequency with a symmetrical $\sin^2 X/X^2$ envelope having a first null at a frequency of 1/code bit width. For clarity of explanation, only a few spectral lines near the center of the spectrum are shown in PN code spectrum 206. Spectral center line 207 is centered at the carrier frequency, $f_o$. The power spectrum is sampled at node 214 and the power in spectral center line 207 and the power in adjacent spectral lines 208–213 are measured after appropriate frequency filtering in control loop 215. The power in spectral center line 207 is sensitive to the relative phase of the bi-phase modulator phase states, while the power in adjacent spectral lines 208–213 is insensitive to the relative phase. A measure of the power in the spectral center line, relative to a reference power level may include the following: 1) the measured power in a subset of adjacent spectral lines ranging from a single adjacent spectral line (spectral line 208 for example) to the entire spectrum excluding the center line; 2) the measured power in a subset of the adjacent spectral lines including spectral center line 207 if a sufficient number of adjacent spectral lines are included to adequately reduce the error introduced by including the center line; and 3) a fixed power reference, for example when changes in the total power at the modulator output over time and environmental operating conditions are adequately contained. It is desirable that bi-phase modulator 201 contain a voltage controlled phase shifter of approximately 20 degrees of control for a 255 bit code length implementation.

Feedback control loop 215 may measure the magnitude of spectral center line 207 relative to the magnitude of a subset of adjacent spectral line 208–213 and desirably develops a control voltage to adjusts the relative phase of the two bi-phase modulator phase states to achieve the desired PN code spectrum. The simplified block diagram of FIG. 2 may be implemented in any application where a PN coded bi-phase modulator is implemented, and where a tight control of the relative phase of the bi-phase modulator phase states is desired.

Figure 3:
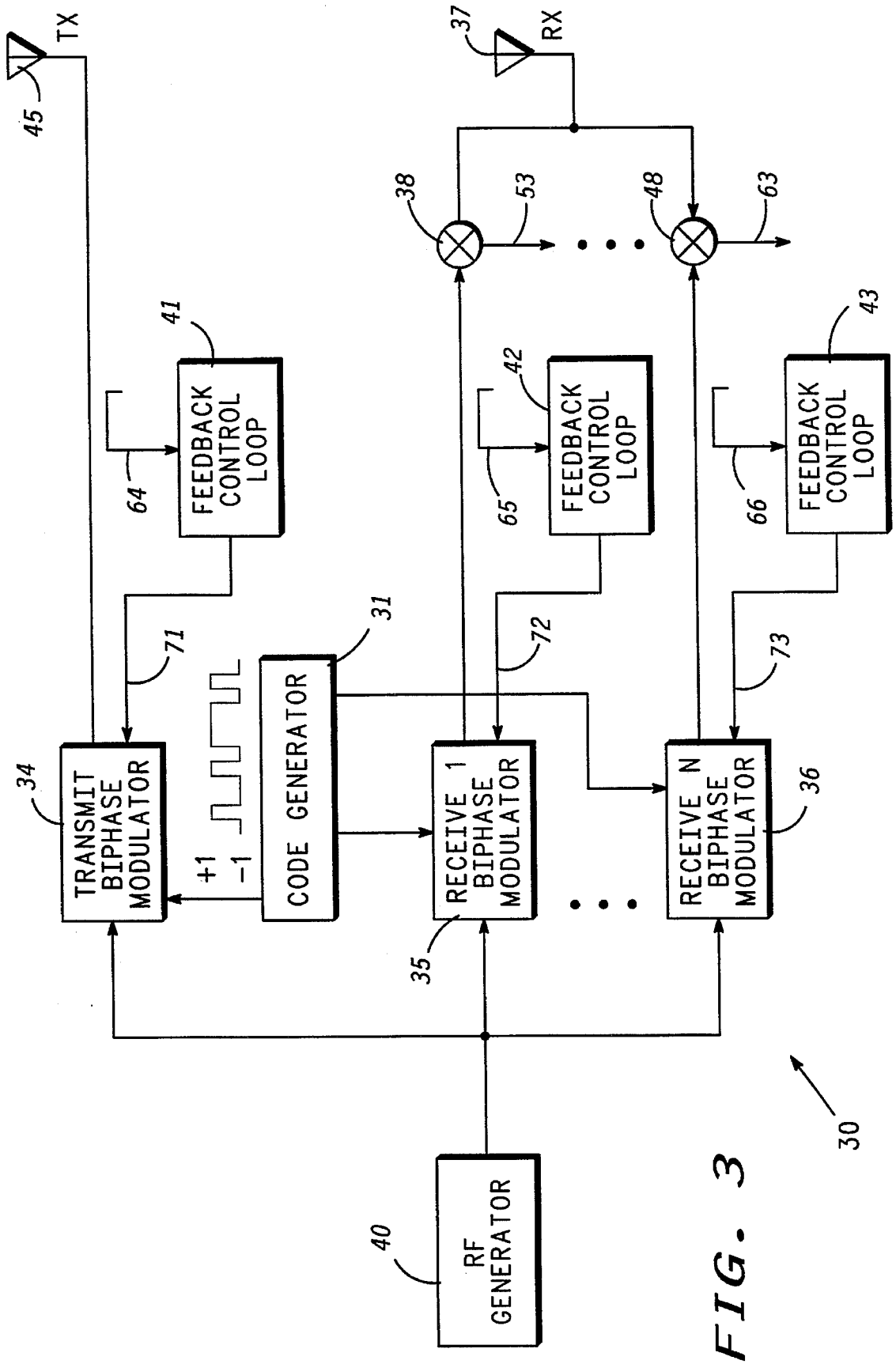
FIG. 3 illustrates a radar system using pseudo-random noise (PN) code sequencing and a feedback control loop in accordance with the present invention.

FIG. 3 illustrates an implementation of the feedback control loop shown in FIG. 2 control loop in the example radar application illustrated in FIG. 1. Separate feedback control loops 41, 42, and 43 are implemented on transmit bi-phase modulator 34 as well as on receive bi-phase modulators 35, 36 in the down conversion mixer LO path for each receive channel of interest. Although FIG. 3 is shown with several feedback control loops 41, 42, 43, this is for illustrative purposes only. The magnitude of the spectral center line at the carrier frequency relative to the magnitude of the adjacent lines in the PN code spectrum is sampled at nodes 64, 65, 66. The magnitude of the spectral center line is a good measure of the modulator phase bias when other characteristics such as modulator isolation (carrier suppression) and amplitude imbalance are controlled to specifications. Feedback control loops 41, 42, 43 measure these attributes of the PN code spectrum at the output of each bi-phase modulator 34, 35, 36 and generate control signals 71, 72, 73 respectively to adjust the modulator phase bias appropriately.

When the relative phase difference associated with the two binary code states is exactly 180 degrees, then the power spectrum measured at the output of bi-phase modulators 34, 35, 36 appears as the characteristic spectrum of a maximal length binary code sequence, centered at the carrier frequency, $f_o$. The magnitude of the spectrum center line at the bi-phase modulator output relative to the total transmit power is given as $10 \log (1/L^2)$. The power spectrum measured at the output of down conversion mixers 38, 48 also appears as the characteristic spectrum of a maximal length binary code sequence but centered at the Doppler frequency, $f_d$. Thus, when the relative phase of the bi-phase modulators is exactly 180 degrees, the magnitude of the spectral center line at each down conversion mixer output relative to the total transmit power is also given as $10 \log (1/L^2)$. The range response after Doppler filtering is essentially a measure of this center spectral line at the output of down conversion mixers 38, 48.

It is desirable that the spectral center line for the power spectrum at mixer output ports 53, 63 to be suppressed below $10 \log (1/L^2)$ to achieve improved range sidelobe rejection. For example, for an optimal phase bias of ARC-COSINE $(L-1)/(L+1))$ degrees for both modulators, the spectral center-line at mixer output ports 53, 63 would be suppressed theoretically to minus infinity for perfect cancellation. When both modulators are biased the same, the correlation process occurring at down conversion mixers 38, 48 is considered to be an autocorrelation. According to the Wiener-Khintchine theorem, the power spectrum at the modulator output 53, 63, is found as the Fourier transform of the autocorrelation of the wide-sense stationary pseudo-random signal at this point. The desired autocorrelation function at the mixer output occurs when the range sidelobes are suppressed to zero. The Fourier transform of this desired perfect range response produces a spectrum with a center spectral line equal in amplitude to the adjacent spectral lines. Thus, the predicted magnitude of the desired spectral center-line equals the magnitude of the adjacent lines when infinite range sidelobe rejection is theoretically approached. This result indicates that a feedback loop is practical to implement since the desired magnitude of the spectral center line is large and can easily be detected and electronically compared to adjacent spectral lines.

The modulator phase bias can also be easily controlled in a variety of ways. For example, a voltage sensitive component such as a diode, varactor, FET transistor, etc., may be designed into a circuit which varies the modulator phase as a function of voltage or current.

Figure 4:
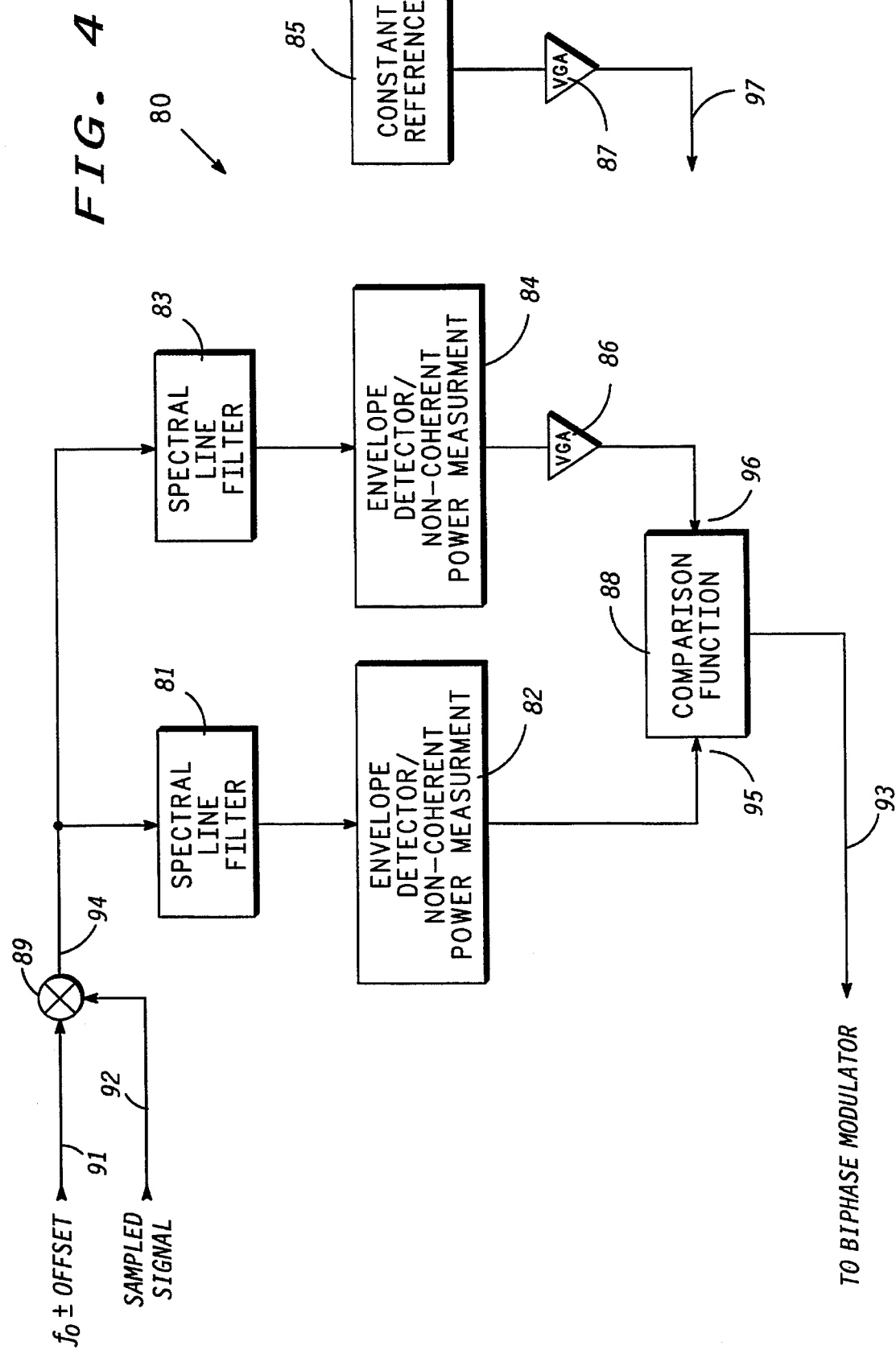
FIG. 4 shows a simplified block diagram of a feedback control loop used to adjust modulator phase bias suitable for use in the present invention.

FIG. 4 illustrates a simplified functional block diagram of feedback control loop 80 suitable for use in the present invention. Feedback control loop 80 adjusts the phase bias of a bi-phase modulator and corresponds with the feedback control loop 215 of FIG. 2 and with feedback control loops 41, 42 and 43 of FIG. 3. Mixer 89 mixes down to baseband a sample of the phase modulated transmitter signal 92 with a CW carrier 91 near the transmit frequency (i.e. pilot signal $f_o +/- f_{offset}$). The pilot signal is desirably a single sideband suppression carrier modulation of the carrier frequency, $f_o$, and the offset frequency, $f_{offset}$. The offset frequency can be picked to be any frequency less than the PN code repetition frequency.

Baseband signal 94 is filtered in spectral line filters 81, 83 and detected in envelop detectors 82, 84 producing a DC signal at nodes 95, 96. Spectral line filter 81 may be a band pass filter passing the spectral center line of the spectrum of the baseband signal at node 94 which is at the offset frequency, $f_{offset}$. Spectral line filter 83 desirably filters one or more adjacent spectral lines. The DC signal at node 95 is proportional to the amplitude of the center line of the PN spectrum at node 94. The DC signal at node 96 is proportional to the amplitude of one or more adjacent spectral lines. The magnitude of the center line of the resulting spectrum at node 95 is compared to the magnitude of the adjacent spectral lines. DC signal at node 96 may be controlled by a variable gain amplifier or attenuator 86 (VGA). Comparison function 88 provides error signal 93 which is used to adjust the relative phase difference of bi-phase modulators 41, 42 and 43 of FIG. 3. For example, if an amplitude difference is observed, the relative phase difference of transmit bi-phase modulator 34 (FIG. 3) is varied in the feedback loop until the center line's magnitude is equal to the reference. The same process is similarly applied to the receive (local oscillator) phase modulated signal in receive bi-phase modulators 35, 36.

In another embodiment of the present invention, constant reference 85 generates a reference signal rather than envelop detector 84, which can also be controlled by a variable gain amplifier/attenuator 87. The magnitude of the center line of the resulting spectrum at node 95 is compared to the magnitude of the reference set in constant reference 85.

The frequency offset, $f_{offset}$, which is set to an arbitrary frequency less than the code repetition frequency, CRF, could theoretically be set to zero. As a practical matter, a slight frequency offset is needed so that the spectral center line is offset from DC to avoid the need for critical DC amplifiers and to allow filtering the effects of imperfections.

Figure 5:
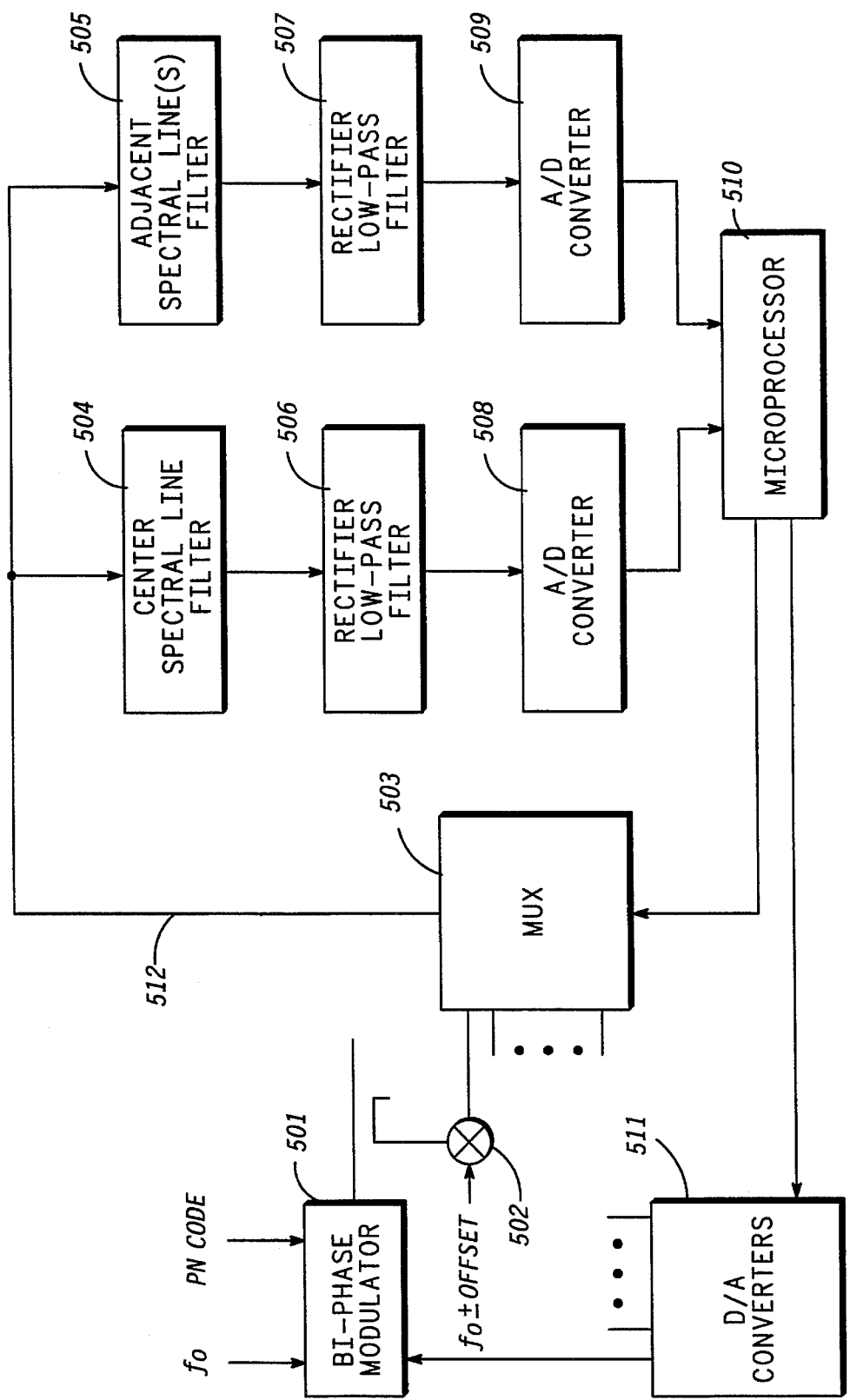
FIG. 5 shows a simplified block diagram of a digital control loop implementing microprocessor to adjust the modulator phase bias suitable for use in the present invention.

In a preferred embodiment, several bi-phase modulators are controlled by a microprocessor. For example, a radar system with a multi-channel receiver would be an application of this embodiment. FIG. 5 shows a simplified block diagram of a digital control loop implementing a microprocessor to adjust the modulator phase bias suitable for use in the present invention. The output of bi-phase modulator 501 is sampled and mixed with a pilot signal in down conversion mixer 502 to produce a spectrum centered at the offset frequency, $f_{offset}$. The sampled and down converted signal is preferably sent to multiplexer 503, along with similarly sampled and down converted signals from other bi-phase modulators in the system. At the multiplexer output, spectral line filter 504 filters the spectral center line of the PN spectrum. Spectral line filter 505 may filter a subset of the plurality of adjacent spectral lines. Preferably, these filtered signals are rectified and filtered in rectifier/filter elements 506, 507, and converted to a digital signal with analog to digital converters 508, 509. The digital signals are used by microprocessor 510 to produce a digital control signal for bi-phase modulator 501.

In a preferred embodiment, the digital control signals are converted to an analog phase adjustment control voltage 512, by the digital to analog converters 511. The microprocessor 510 desirably, sequentially selects the specific bi-phase modulator whose phase adjustment control voltage is to be modified by multiplexer 503. Microprocessor 510 further computes an appropriate change in the phase adjustment control voltage to achieve the desired bi-phase modulator spectrum corresponding to the desired relative phase value, and may set a new phase adjustment control voltage 512 for the selected bi-phase modulator by sending the new digital control signal to digital to analog converter 511. This process is desirably repeated for each of bi-phase modulators 501 in the system in a cyclic sequential order.

Figure 6:
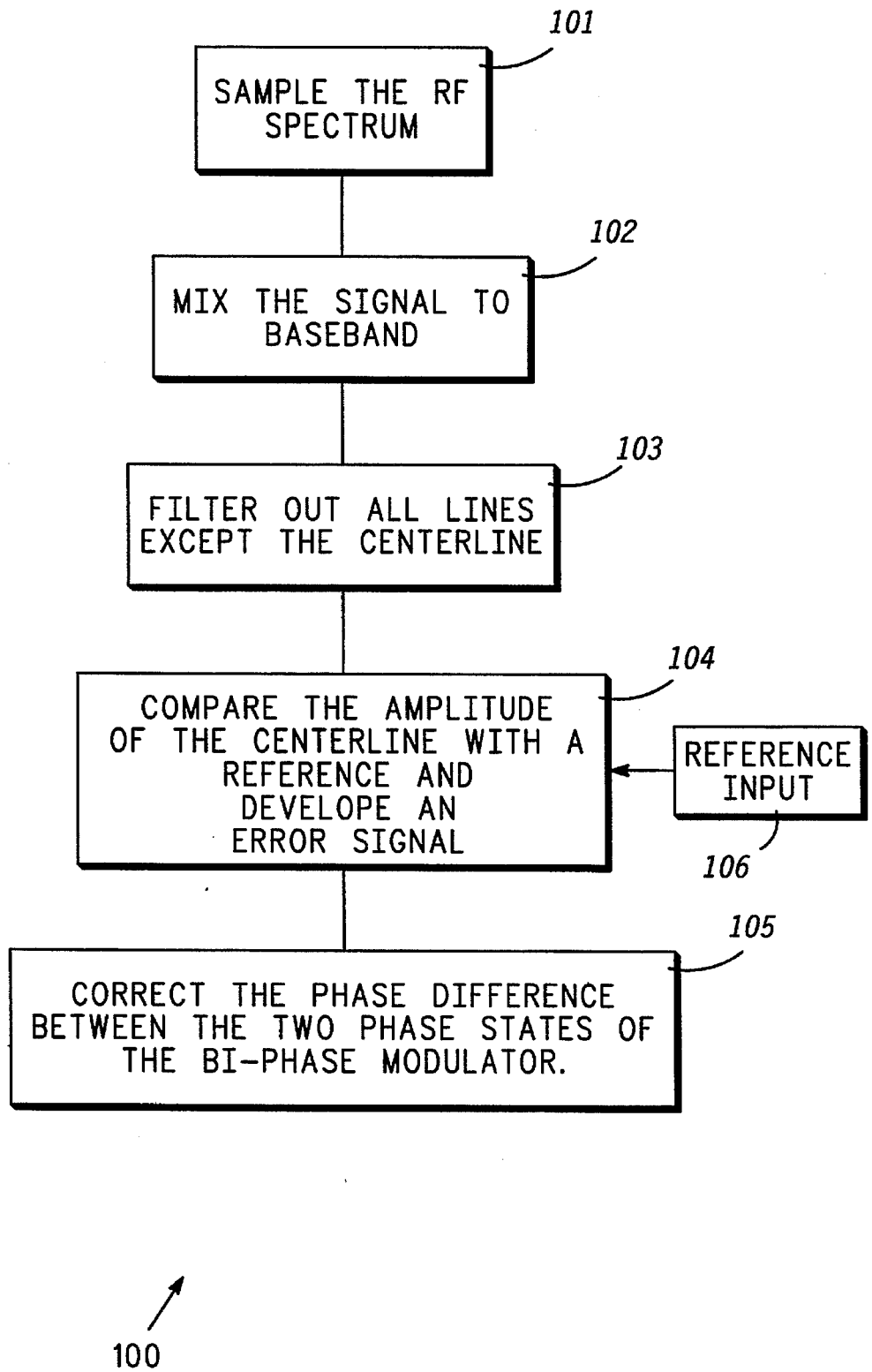
FIG. 6 illustrates a flow chart of a procedure for adjusting the relative phase difference between the two phase states of the bi-phase modulator.

FIG. 6 illustrates a flow chart of procedure 100 for adjusting the relative phase difference between the two phase states in a bi-phase modulator. Procedure 100 may be implemented with either analog or digital circuitry. The method of procedure 100 is desirably implemented by control loop 41, 42, and/or 43 of FIG. 3.

Procedure 100 first samples the RF spectrum of the bi-phase modulated signals. Step 102 mixes the signal to a baseband. Step 103 filters out all spectral lines except the center line. Step 104 compares the amplitude of the spectral center line with either a fixed reference or with the amplitude of one or more of the adjacent spectral lines. Additionally, step 104 generates an error signal based on this comparison. Finally step 105 uses this error signal in the transmit and receive bi-phase modulators to correct the phase difference between the two phase states.

Matching the amplitude of the center line with the next adjacent spectral line in a PN coded system is only one embodiment of this invention. For example, the control loop could be operated where the out-of-range rejection null is broader than the point where the phase bias is ARC-COSINE $((L-1)/(L+1))$ degrees. For a 255 bit code sequence, the phase bias would be approximately 7.17 degrees.

Further, an amplitude imbalance may exist in a bi-phase modulator so that the two phases have slightly different losses. For example, an amplitude balance requirement of ±0.2 dB is probably typical for a bi-phase modulator in production. Modulator phase bias can also be used to compensate for amplitude imbalances. With transmit modulator amplitude imbalances, for example, of ±0.1 dB and ±0.2 dB there is approximately a 0.1 dB loss in the 0 degree (or −1 bit) with respect to the 180 degree (or +1 bit) for a 225 bit code sequence. The maximum out-of-range rejection may be achieved with this amplitude imbalance by setting the transmit modulator phase bias to 5 degrees, for example, and the receive modulator phase bias to about 10 degrees, for example, assuming the code length is 255 bits. The corresponding amplitudes of the transmitter and receiver spectral lines to control this null can readily be determined. An example operating point can be identified to indicate that a better selection may be the 4 degrees relative phase difference in the LO modulator and 13 degrees relative phase difference phase bias in the transmitter modulator discussed in the previous implementation alternative, since the null is broader.

Thus, a method and apparatus has been described which improve auto-correlation and range correlation in a pseudo-random noise coded system has been described. The system overcomes the theoretical limit of out of range clutter rejection by offsetting the relative phase difference of a bi-phase modulator. Further, a bi-phase modulator control loop has been described to maintain the desired relative phase difference in the bi-phase modulator to sustain an improvement in out of range clutter rejection. The bi-phase modulator control loop sets the amplitude of the center line of the PN spectrum with respect to the other lines in the PN spectrum. Adjusting and controlling the relative phase difference of the bi-phase modulator overcomes the limited sidelobe suppression of prior art systems.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for improving autocorrelation in a pseudo-random noise coded system, comprising the steps of:

phase modulating a carrier frequency with a pseudo-random noise code sequence to produce a phase modulated carrier frequency, said phase modulated carrier frequency having two phase states, said phase states having a relative phase difference of approximately one-hundred eighty degrees;

transmitting a transmit signal that includes said phase modulated carrier frequency;

adjusting said relative phase difference between said two phase states of said phase modulated carrier frequency based on a magnitude of a center spectral line of said transmit signal to maintain a predetermined phase offset from said relative phase difference; and correlating a received signal with a reference signal that has spectral characteristics of said pseudo-random noise code sequence.

2. A method as claimed in claim 1 further comprising the steps of:

receiving said received signal, said received signal including a Doppler shifted version of said transmit signal;

generating said reference signal by phase modulating said carrier frequency with a second pseudo-random noise code sequence, said reference signal having two phase states that have a second relative phase difference of approximately one-hundred eighty degrees, said second pseudo-random noise code sequence being a delayed version of said pseudo-random noise code sequence; and adjusting said second relative phase difference between said two phase states of said reference signal based on a magnitude of a center spectral line of said reference signal to maintain a second predetermined phase offset from said second relative phase difference.

3. A method as claimed in claim 2 further comprising the step of:

sampling said phase modulated carrier frequency to generate an error signal, and wherein:

the adjusting said relative phase difference step further comprises the step of adjusting said relative phase difference based on said error signal, and wherein said pseudo-random noise code sequence has a spectrum comprised of a plurality of spectral lines including said center spectral line, each spectral line of said plurality having a magnitude, and said sampling step additionally comprises the steps of:

mixing said phase modulated carrier frequency with a pilot signal to obtain a baseband signal;

filtering said baseband signal to produce a center line signal proportional to the magnitude of said center spectral line of said spectrum of said pseudo-random noise code sequence; and comparing said center line signal to a reference voltage to produce said error signal.

4. A method as claimed in claim 2 wherein:

said predetermined phase offset is based in part by a code length of said pseudo-random noise code sequence, and wherein the adjusting said relative phase difference step includes the step of adjusting said relative phase difference to maintain said predetermined phase offset from said relative phase difference on said two phase states of said transmit signal, and wherein the correlating step includes the step of combining said received signal with said reference signal.

5. A method as claimed in claim 3 wherein:

said phase modulating step additionally comprises the step of phase modulating said carrier frequency with said pseudo-random noise code sequence, said pseudo-random noise code sequence having a code repetition frequency, and said mixing step additionally comprises the step of mixing said transmit signal with said pilot signal wherein said pilot signal is a single sideband suppressed carrier modulation of said carrier frequency and is offset from said carrier frequency by an offset frequency, said offset frequency being less than said code repetition frequency.

6. A method as claimed in claim 2 wherein said phase modulating step additionally comprises the step of phase modulating said carrier frequency with a bi-phase modulator having means for phase modulating said carrier frequency to produce said two phase states, and wherein the generating step additionally comprises the step of phase modulating said carrier frequency with a second bi-phase modulator having means for modulating said carrier frequency to produce said two phase states of said reference signal.

7. A method as claimed in claim 3 wherein said comparing step additionally comprises the step of comparing said center line signal to said reference voltage, said reference voltage being generated from at least one spectral line of said plurality of spectral lines.

8. A method as claimed in claim 3 wherein said adjusting said relative phase difference step additionally comprises the step of adjusting said relative phase difference based on a difference in magnitude between said center spectral line and an adjacent spectral line of said plurality of spectral lines.

9. A method as claimed in claim 3 wherein said comparing step additionally comprises the step of comparing said center line signal to said reference voltage, said reference voltage being a fixed voltage.

10. A method as claimed in claim 3 wherein said comparing step additionally comprises the step of comparing said center line signal to said reference voltage, said reference voltage being generated by a subset of said plurality of spectral lines, said plurality including said center spectral line.

11. A method as claimed in claim 4 wherein said pseudo-random noise code sequence has a code length of 255 bits, and wherein:

said adjusting said relative phase difference step additionally comprises the step of adjusting said relative phase difference to include said predetermined phase offset, said predetermined phase offset being between approximately four and ten degrees, and said adjusting said second relative phase difference step additionally comprises the step of adjusting said second relative phase difference to include said second predetermined phase offset, said second predetermined phase offset being between approximately four and ten degrees.

12. A method as claimed in claim 4 wherein said pseudo-random noise code sequence has a code length of L bits, and wherein:

said adjusting said relative phase difference step additionally comprises the step of adjusting said relative phase difference to include said predetermined phase offset, said predetermined phase offset being approximately arc-cosine$(L-1/L+1)$ degrees, and said adjusting said second relative phase difference step additionally comprises the step of adjusting said second relative phase difference to include said second predetermined phase offset, said second predetermined phase offset being approximately arc-cosine(L−1/L+1) degrees.

13. A method as claimed in claim 12 wherein further comprising the step of generating said pseudo-random noise code sequence, said pseudo-random noise code sequence being a periodic maximal length binary code sequence.

14. A method of improving out of range rejection in a pseudo-random noise coded system comprising the steps of:

sampling a transmitted signal comprised of a carrier frequency phase modulated with a first pseudo-random noise code sequence, said first pseudo-random noise code sequence having two phase states with a first relative phase difference, the sampling step producing a sampled transmitted signal;

generating a first error signal based on said sampled transmitted signal;

adjusting said first relative phase difference between said two phase states of said first pseudo-random noise code sequence based on said first error signal to maintain a first predetermined phase offset from said first relative phase difference, said first predetermined phase offset based on a code length of said first pseudo-random noise code sequence; and combining a received signal with a reference signal having a spectral characteristic of said first pseudo-random noise code sequence to obtain a correlation range response.

15. A method as claimed in claim 14 further comprising the steps of:

receiving said received signal, said received signal including a Doppler shifted version of said transmitted signal;

generating said reference signal by phase modulating said carrier frequency with a second pseudo-random noise code sequence, said second pseudo-random noise code sequence being a delayed version of said first pseudo-random noise code sequence and having two phase states with a second relative phase difference;

sampling said reference signal to produce a sampled reference signal;

generating a second error signal based on said sampled reference signal; and adjusting said second relative phase difference between said two phase states of said reference signal based on said second error signal to maintain a second predetermined phase offset from said second relative phase difference.

16. A method as claimed in claim 15 wherein the combining step further comprises the steps of:

mixing said received signal with said reference signal to produce an output signal; and filtering said output signal to obtain said correlation range response, and wherein the sampled transmitted signal is comprised of first spectral lines including a first center spectral line and first adjacent spectral lines, the step of generating said first error signal further comprises the step of generating said first error signal based on a difference in magnitude between said first center spectral line and said first adjacent spectral lines, the sampled reference signal is comprised of second spectral lines including a second center spectral line and second adjacent spectral lines, and the step of generating said second error signal further comprises the step of generating said second error signal based on a difference in magnitude between said second center spectral line and said second adjacent spectral lines.

17. A pseudo-random noise coded system for improving discrimination between returns from a target and returns from clutter comprising;

an radio frequency generator for generating a carrier frequency;

a transmit bi-phase modulator for generating a transmit signal comprised of said carrier frequency phase modulated with a first pseudo-random noise coded sequence, said transmit bi-phase modulator coupled to said radio frequency generator and having a transmit phase control port and a transmit output port;

a transmit antenna for transmitting said transmit signal and coupled to said transmit output port of said bi-phase modulator;

a receive bi-phase modulator for generating a reference signal comprised of said carrier frequency phase modulated with a second pseudo-random noise coded sequence, said second pseudo-random noise coded sequence being a delayed version of said first pseudo-random noise coded sequence, said receive bi-phase modulator coupled to said radio frequency generator and having a receive phase control port and a receive output port;

a receive antenna for receiving a received signal, said received signal being a Doppler shifted version of said transmit signal; and a correlator for producing a Doppler frequency from said received signal and said reference signal, said correlator having first, second and third ports, said first port coupled to said receive bi-phase modulator, said receive antenna coupled to said second port of said correlator.

18. A pseudo-random noise coded system as claimed in claim 17 wherein said transmit bi-phase modulator has a transmit phase control port for adjusting a first amount of relative phase difference between two code states of said first pseudo-random noise coded sequence, said receive phase control port for adjusting a second amount of relative phase difference between two code states of said second pseudo-random noise coded sequence, said pseudo-random noise coded system further comprising:

a transmit feedback control loop coupled to said transmit phase control port for sampling said transmit signal and providing a first error signal to said transmit phase control port, said first error signal adjusting said first amount of relative phase difference; and a receive feedback control loop coupled to said receive phase control port for sampling said reference signal and providing a second error signal to said receive phase control port, said second error signal adjusting said second amount of relative phase difference.

19. A pseudo-random noise coded system as claimed in claim 18 wherein said pseudo-random noise coded sequence has a spectrum comprised of a plurality of spectral lines including a center spectral line, and wherein said transmit feedback control loop comprises:

a mixing element for mixing a pilot signal with a sampled transmit signal to provide a baseband signal, said mixing element having an output port;

a spectral line filter for filtering said baseband signal producing said center line of said spectrum, said spectral line filter coupled to said output port of said mixing element;

a detector coupled to said spectral line filter for producing a center line signal proportional to said center spectral line of said spectrum; and a comparator coupled to said detector for comparing said center line signal to an internal reference signal, said comparator generating said first error signal for adjusting said first amount of relative phase difference.

20. A pseudo-random noise coded system as claimed in claim 17 further comprising:

a mixing element for mixing a pilot signal with a sampled reference signal to provide a baseband signal, said mixing element having an output port;

a spectral line filter for filtering said baseband signal producing said center line of said spectrum, said spectral line filter coupled to said output port of said mixing element;

a detector coupled to said spectral line filter for producing a center line signal proportional to said center line of said spectrum; and a comparator coupled to said detector for comparing said center line signal to a reference signal, said comparator generating said second error signal for adjusting said second amount of relative phase difference.

21. A pseudo-random noise coded system as claimed in claim 19 wherein said internal reference signal is generated from at least one spectral line of said plurality of spectral lines.

22. A pseudo-random noise coded system as claimed in claim 18 wherein said pseudo-random noise coded sequence is a periodic maximal length binary code sequence having a code repetition frequency, and wherein said pilot signal is a single sideband suppressed carrier modulation offset from said carrier frequency by an offset frequency, said offset frequency being less than said code repetition frequency.

23. A pseudo-random noise coded system as claimed in claim 18 wherein said pseudo-random noise coded sequence has a code length of 255 bits, and said transmit feedback control loop and said receive feedback control loop independently adjusts said first and second amounts of relative phase difference between approximately four and ten degrees.

24. A pseudo-random noise coded system as claimed in claim 18 wherein said pseudo-random noise coded sequence has a code length of L bits, and said transmit feedback control loop and said receive feedback control loop independently adjusts said first and second amounts of relative phase difference approximately arc-cosine(L−1/L+1) degrees.

25. A pseudo-random noise coded system for improving discrimination between returns from a target and returns from clutter comprising:

a transmit bi-phase modulator for generating a transmit signal comprised of a carrier frequency phase modulated with a first pseudo-random noise (PN) code sequence, said first PN code sequence having two code states resulting in two phase states of said transmit signal that have a first relative phase difference of approximately one-hundred eighty degrees;

a transmit feedback control loop for sampling said transmit signal and producing a transmit feedback signal based on a magnitude of spectral lines of said transmit signal, and wherein said transmit bi-phase modulator has means for adjusting said first relative phase difference based on said transmit feedback signal to maintain a first predetermined phase offset from said first relative phase difference of said two phase states; and a correlator for combining a received signal with a reference signal to obtaining a correlation range response, said reference signal including said carrier frequency phase modulated with a second PN code sequence, said second PN code sequence being a delayed version of said first PN code sequence.

26. A pseudo-random noise coded system as claimed in claim 25 further comprising:

a receive bi-phase modulator for generating said reference signal, said second PN code sequence having two code states resulting in two phase states that have a second relative phase difference of approximately one-hundred eighty degrees; and a receive feedback control loop for sampling said reference signal and producing a reference feedback signal based on a magnitude of spectral lines of said reference signal and wherein said correlator further produces a Doppler frequency from said received signal and said reference signal, said received signal being a Doppler shifted version of said transmit signal, and wherein said receive bi-phase modulator has means for adjusting said second relative phase difference based on said reference feedback signal to maintain a second predetermined phase offset from said second relative phase difference of said two phase states of said second PN code sequence.

* * * * *

UNITED STATES PATENT AND TRADEMARK OFFICE
CERTIFICATE OF CORRECTION

Page 1 of 2

PATENT NO. : 5,497,160
DATED : March 5, 1996
INVENTOR(S) : Thomas F. Koehler et al.

It is certified that error appears in the above-indentified patent and that said Letters Patent is hereby corrected as shown below:

In column 13, claim 13, line 7, delete "wherein".

In column 14, claim 17, line 9, delete "an" and insert --a--.

In column 14, claim 17, line 12, delete "comprised of" and insert --comprising--.

In column 14, claim 17, line 21, delete "comprised of" and insert --comprising--.

In column 14, claim 18, line 39, delete "transmit bi-phase modulator has a".

In column 14, claim 18, line 48, insert --is-- after "port".

In column 14, claim 19, line 58, insert --first-- after "said".

In column 14, claim 19, line 66, insert --spectral-- after "center".

In column 15, claim 20, line 11, delete "17 further comprising" and insert --18 wherein said second pseudo-random noise coded sequence has a spectrum comprised of a plurality of spectral lines including a center spectral line, wherein said receive feedback control loop comprises--.

In column 15, claim 20, line 16, insert --spectral-- after "center".

In column 15, claim 20, line 20, insert --spectral-- after "center".

In column 15, claim 22, line 31, delete "18" and insert --19-- and insert --first-- after "said".

UNITED STATES PATENT AND TRADEMARK OFFICE
CERTIFICATE OF CORRECTION

PATENT NO. : 5,497,160
DATED : March 5, 1996
INVENTOR(S) : Thomas F. Koehler et al.

It is certified that error appears in the above-indentified patent and that said Letters Patent is hereby corrected as shown below:

In column 15, claim 23, line 38, insert --first and second-- after "said".

In column 15, claim 23, lines 38/39, delete "sequence has" and insert --sequences have--.

In column 15, claim 23, line 40, delete "and said receive feedback control loop".

In column 15, claim 24, line 45, insert --first and second-- after "said".

In column 15, claim 24, lines 45/46, delete "sequence has" and insert --sequences have--.

In column 15, claim 24, line 47, delete "and said receive feedback control loop".

In column 16, claim 25, line 21, delete "obtaining" and insert --obtain--.

Signed and Sealed this

Seventh Day of October, 1997

Attest:

BRUCE LEHMAN

Attesting Officer

Commissioner of Patents and Trademarks